(12) United States Patent
Nakadate et al.

(10) Patent No.: US 10,381,626 B2
(45) Date of Patent: Aug. 13, 2019

(54) HEAT-RESISTANT SYNTHETIC RESIN MICROPOROUS FILM AND METHOD FOR PRODUCING THE SAME

(71) Applicant: ASAHI KASEI KABUSHIKI KAISHA, Tokyo (JP)

(72) Inventors: Junichi Nakadate, Osaka (JP); Taehyung Cho, Osaka (JP); Takahiko Sawada, Osaka (JP); Yuki Kanaoka, Osaka (JP); Masahiko Gotoh, Saitama (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 228 days.

(21) Appl. No.: 15/522,797

(22) PCT Filed: Nov. 4, 2015

(86) PCT No.: PCT/JP2015/081048
§ 371 (c)(1),
(2) Date: Apr. 28, 2017

(87) PCT Pub. No.: WO2016/072420
PCT Pub. Date: May 12, 2016

(65) Prior Publication Data
US 2017/0317329 A1   Nov. 2, 2017

(30) Foreign Application Priority Data

Nov. 5, 2014   (JP) ................. 2014-225066

(51) Int. Cl.
| | |
|---|---|
| H01M 4/02 | (2006.01) |
| H01M 2/16 | (2006.01) |
| C08F 2/00 | (2006.01) |
| C08F 2/46 | (2006.01) |
| C08J 9/36 | (2006.01) |
| C08J 7/06 | (2006.01) |
| B29C 71/02 | (2006.01) |
| C08J 7/12 | (2006.01) |
| H01M 2/14 | (2006.01) |
| H01M 10/0525 | (2010.01) |
| C08J 7/18 | (2006.01) |

(52) U.S. Cl.
CPC ............ *H01M 2/1686* (2013.01); *C08F 2/00* (2013.01); *C08F 2/46* (2013.01); *C08J 7/06* (2013.01); *C08J 7/08* (2013.01); *C08J 7/123* (2013.01); *C08J 7/18* (2013.01); *C08J 9/36* (2013.01); *H01M 2/145* (2013.01); *H01M 2/16* (2013.01); *H01M 2/1653* (2013.01); *H01M 10/0525* (2013.01); *C08J 2323/12* (2013.01); *C08J 2435/02* (2013.01); *H01M 2220/30* (2013.01)

(58) Field of Classification Search
CPC ........................................................ H01M 4/02
See application file for complete search history.

(56) References Cited

U.S. PATENT DOCUMENTS

2015/0303428 A1   10/2015   Sawada et al.

FOREIGN PATENT DOCUMENTS

| | | |
|---|---|---|
| JP | 2003-22793 | 1/2003 |
| JP | 2006-164761 | 6/2006 |
| JP | 2009-277397 | 11/2009 |
| JP | 2013-57010 | 3/2013 |
| JP | 2013-71939 | 4/2013 |
| JP | 2013-231878 | 11/2013 |
| JP | 2014-17264 | 1/2014 |
| JP | 5530353 | 4/2014 |
| WO | 2009-151054 | 12/2009 |
| WO | 2013/162071 | 10/2013 |
| WO | 2014/073451 | 5/2014 |
| WO | WO 2014/073451 | * 5/2014 |

OTHER PUBLICATIONS

International Search Report dated Feb. 9, 2016 in International (PCT) Application No. PCT/JP2015/081048.

* cited by examiner

*Primary Examiner* — Jacob B Marks
(74) *Attorney, Agent, or Firm* — Wenderoth, Lind & Ponack, L.L.P.

(57) ABSTRACT

Provided are a heat-resistant synthetic resin microporous film that has both good heat resistance and good mechanical strength and exhibits a suppressed decrease in mechanical strength over time, and a method for producing the heat-resistant synthetic resin microporous film. The heat-resistant synthetic resin microporous film of the present invention includes a synthetic resin microporous film, and a coating layer formed on at least part of the surface of the synthetic resin microporous film and containing a polymer of a polymerizable compound having two or more radically polymerizable functional groups per molecule. The maximum thermal shrinkage rate of the heat-resistant synthetic resin microporous film when heated from 25° C. to 180° C. at a temperature rising rate of 5° C./min is 15% or less. The piercing strength thereof is 0.6 N or more. The rate of retention of the piercing strength after heating at 70° C. for 168 hours is 85% or more.

18 Claims, No Drawings

HEAT-RESISTANT SYNTHETIC RESIN MICROPOROUS FILM AND METHOD FOR PRODUCING THE SAME

TECHNICAL FIELD

The present invention relates to a heat-resistant synthetic resin microporous film and a method for producing the same.

BACKGROUND ART

Lithium-ion secondary batteries have been used as batteries of portable electronic devices for years. Such a lithium-ion secondary battery typically includes a positive electrode, a negative electrode, and a separator all disposed in an electrolytic solution. The positive electrode is formed by applying lithium cobalt oxide or lithium manganese oxide to the surface of an aluminum foil. The negative electrode is formed by applying carbon to the surface of a copper foil. The separator is disposed so as to separate the positive electrode and the negative electrode and prevents an electrical short circuit between the electrodes.

During charging of the lithium-ion secondary battery, lithium ions are released from the positive electrode and move into the negative electrode. During discharging of the lithium-ion secondary battery, lithium ions are released from the negative electrode and move into the positive electrode. Therefore, the separator needs to allow ions such as lithium ions to permeate therethrough.

As the separator, a synthetic resin microporous film is used because it has insulation properties and is inexpensive. The synthetic resin microporous film contains a synthetic resin, such as a propylene-based resin.

The synthetic resin microporous film is produced by stretching a synthetic resin film. The high residual stress due to stretching is generated in the synthetic resin microporous film produced by a stretching method. Thus, it has been pointed out that such a synthetic resin microporous film may thermally shrink under high temperature, which may cause a short circuit between the positive electrode and the negative electrode. Therefore, there is a need to ensure the safety of the lithium-ion secondary battery by improving the heat resistance of the synthetic resin microporous film.

Patent Literature 1 discloses, as a lithium-ion secondary battery separator, a synthetic resin microporous film that has been treated with electron beam irradiation and whose value obtained by thermomechanical analysis (TMA) at 100° C. is 0% to −1%.

CITATION LIST

Patent Literature

Patent Literature 1: Japanese Patent Application Laid-Open No. 2003-22793

SUMMARY OF INVENTION

Technical Problem

However, the synthetic resin microporous film that has been treated only with electron beam irradiation still has insufficient heat resistance. Furthermore, the treatment only with electron beam irradiation make the synthetic resin microporous film brittle to reduce the mechanical strength. That is, electron beam irradiation cleaves the molecular chains of the synthetic resin in the synthetic resin microporous film and reduces the mechanical strength of the synthetic resin microporous film. Furthermore, electron beam irradiation may generate residual radicals in the synthetic resin microporous film. When residual radicals are generated, the residual radicals cleave the molecular chain of the synthetic resin contained in the synthetic resin microporous film over time and reduce the mechanical strength of the synthetic resin microporous film over time.

The synthetic resin microporous film having low mechanical strength may reduce the productivity and the safety of the lithium-ion secondary battery. For example, when the synthetic resin microporous film having low mechanical strength is cut in the battery production process, the synthetic resin microporous film may tear. The synthetic resin microporous film having low mechanical strength fails to prevent a short circuit between the electrodes and may reduce the safety of the lithium-ion secondary battery. Therefore, there is a need for a separator that has both good heat resistance and good mechanical strength and exhibits a suppressed decrease in mechanical strength over time.

The present invention provides a heat-resistant synthetic resin microporous film that has both good heat resistance and good mechanical strength and exhibits a suppressed decrease in mechanical strength over time and also provides a method for producing the heat-resistant synthetic resin microporous film.

Means for Solving Problem

The heat-resistant synthetic resin microporous film of the present invention includes:
a synthetic resin microporous film; and
a coating layer formed on at least part of the surface of the synthetic resin microporous film and containing a polymer of a polymerizable compound having two or more radically polymerizable functional groups per molecule,
the heat-resistant synthetic resin microporous film having a maximum thermal shrinkage rate of 15% or less when heated from 25° C. to 180° C. at a temperature rising rate of 5° C./min, a piercing strength of 0.6 N or more and a rate of retention of the piercing strength of 85% or more after heating at 70° C. for 168 hours.

A method for producing the heat-resistant synthetic resin microporous film of the present invention includes:
an applying step of applying a polymerizable compound having two or more radically polymerizable functional groups per molecule to at least part of the surface of a synthetic resin microporous film;
an irradiating step of irradiating, with active energy rays at an irradiation dose of 40 to 70 kGy, the synthetic resin microporous film to which the polymerizable compound has been applied; and
a heating step of heating, in an atmosphere having an oxygen concentration of 300 ppm or less, the synthetic resin microporous film irradiated with the active energy rays.

Advantageous Effects of Invention

The present invention provides the heat-resistant synthetic resin microporous film that has both good heat resistance and good mechanical strength and exhibits a suppressed decrease in mechanical strength over time, and provides a method for producing the heat-resistant synthetic resin microporous film.

DESCRIPTION OF EMBODIMENTS

The heat-resistant synthetic resin microporous film of the present invention includes a synthetic resin microporous film, and a coating layer formed on at least part of the surface of the synthetic resin microporous film.

(Synthetic Resin Microporous Film)

As the synthetic resin microporous film, any microporous film that has been used as a separator in secondary batteries known in the art, such as lithium-ion secondary batteries, can be used without any limitation. The synthetic resin microporous film is preferably an olefin-based resin microporous film.

The olefin-based resin microporous film contains an olefin-based resin. The olefin-based resin is preferably an ethylene-based resin or a propylene-based resin, and more preferably a propylene-based resin.

Examples of the propylene-based resin include homopolypropylene and copolymers of propylene and other olefins. When the synthetic resin microporous film is produced by a stretching method, homopolypropylene is preferred. Such propylene-based resins may be used alone or in combination of two or more. Copolymers of propylene and other olefins may be either block copolymers or random copolymers. The amount of a propylene component in the propylene-based resin is preferably 50% by weight or more, and more preferably 80% by weight or more.

Examples of olefins to be copolymerized with propylene include α-olefins, such as ethylene, 1-butene, 1 pentene, 4-methyl-1-pentene, 1-hexene, 1-octene, 1-nonene, and 1-decene. Ethylene is preferred.

Examples of the ethylene-based resin include ultra-low-density polyethylene, low-density polyethylene, linear low-density polyethylene, medium-density polyethylene, high-density polyethylene, ultra-high-density polyethylene, and ethylene-propylene copolymers. The ethylene-based resin microporous film may contain another olefin-based resin as long as the microporous film contains an ethylene-based resin. The amount of the ethylene component in the ethylene-based resin is preferably more than 50% by weight, and more preferably 80% by weight or more.

The weight average molecular weight of the olefin-based resin is preferably 30,000 to 500,000, and more preferably 50,000 to 480,000. The weight average molecular weight of the propylene-based resin is preferably 250,000 to 500,000, and more preferably 280,000 to 480,000. The weight average molecular weight of the ethylene-based resin is preferably 30,000 to 250,000, and more preferably 50,000 to 200,000. The olefin-based resin having a weight average molecular weight in the above-described range can provide an olefin-based resin microporous film having good film formation stability and containing uniform micropore parts.

The molecular weight distribution (weight average molecular weight Mw/number average molecular weight Mn) of the olefin-based resin is preferably 5.0 to 30, and more preferably 7.5 to 25. The molecular weight distribution (weight average molecular weight Mw/number average molecular weight Mn) of the propylene-based resin is preferably 7.5 to 12, and more preferably 8 to 11. The molecular weight distribution (weight average molecular weight Mw/number average molecular weight Mn) of the ethylene-based resin is preferably 5.0 to 30, and more preferably 8.0 to 25. The olefin-based resin having a molecular weight distribution in the above-described range can provide an olefin-based resin microporous film having high surface porosity and good mechanical strength.

The weight average molecular weight and the number average molecular weight of the olefin-based resin are polystyrene-equivalent values determined by GPC (gel permeation chromatography). Specifically, 6 to 7 mg of the olefin-based resin is collected and the collected olefin-based resin is supplied to a test tube. To the test tube, an o-DCB (ortho-dichlorobenzene) solution containing 0.05% by weight of BHT (dibutylhydroxytoluene) is added such that the olefin-based resin is diluted to 1 mg/mL to prepare a diluted liquid.

The diluted liquid is shaken at a rotational speed of 25 rpm at 145° C. for 1 hour by using a dissolving and filtering device to dissolve the olefin-based resin in the o-DCB solution, which provides a test sample. The weight average molecular weight and the number average molecular weight of the olefin-based resin can be determined by GPC using this test sample.

The weight average molecular weight and the number average molecular weight of the olefin-based resin can be determined by, for example, the following measurement apparatus and measurement conditions.

Measurement Apparatus
   Trade name "HLC-8121 GPC/HT" available from Tosoh Corporation Measurement Conditions
   Column: TSKgel GMHHR-H(20)HT×3
   TSKguard column HHR(30)HT×1
   Mobile phase: o-DCB 1.0 mL/min
   Sample Concentration: 1 mg/mL
   Detector: Bryce-type refractometer
   Standard substance: Polystyrene (available from Tosoh Corporation, molecular weight: 500 to 8,420,000)
   Elution condition: 145° C.
   SEC temperature: 145° C.

The melting point of the olefin-based resin is preferably 130 to 170° C., and more preferably 133 to 165° C. The melting point of the propylene-based resin is preferably 160 to 170° C., and more preferably 160 to 165° C. The melting point of the ethylene-based resin is preferably 130 to 140° C., and more preferably 133 to 139° C. The olefin-based resin having a melting point in the above-described range can provide an olefin-based resin microporous film that has good film formation stability and exhibits a suppressed decrease in mechanical strength at high temperature.

In the present invention, the melting point of the olefin-based resin can be determined in accordance with the following procedure using a differential scanning calorimeter (for example, device name "DSC220C" available from Seiko Instruments Inc.,). First, 10 mg of the olefin-based resin is heated from 25° C. to 250° C. at a temperature rising rate of 10° C./min, and held at 250° C. for 3 minutes. Next, the olefin-based resin is cooled from 250° C. to 25° C. at a cooling rate of 10° C./min, and held at 25° C. for 3 minutes. Subsequently, the olefin-based resin is reheated from 25° C. to 250° C. at a temperature rising rate of 10° C./min. The endothermic peak temperature in this reheating process is taken as the melting point of the olefin-based resin.

The synthetic resin microporous film contains micropore parts. The micropore parts preferably penetrate through the synthetic resin microporous film in the film thickness direction, which imparts good air permeation performance to the heat-resistant synthetic resin microporous film. Such a heat-resistant synthetic resin microporous film allows ions, such as lithium ions, to permeate therethrough in the thickness direction.

The air permeability of the synthetic resin microporous film is preferably 50 to 600 sec/100 mL, and more preferably 100 to 300 sec/100 mL. The synthetic resin microporous film having an air permeability in the above-described range can provide the heat-resistant synthetic resin microporous film having both good mechanical strength and good ion permeability.

The air permeability of the synthetic resin microporous film is a value obtained by determining the air permeability at ten points with 10-cm intervals in the longitudinal direction of the synthetic resin microporous film in accordance with JIS P8117 in an atmosphere having a temperature of 23° C. and a relative humidity of 65%, and calculating the arithmetic mean of the air permeability.

The surface porosity of the synthetic resin microporous film is preferably 25 to 55% and more preferably 30 to 50%. The synthetic resin microporous film having a surface porosity in the above-described range can provide the heat-resistant synthetic resin microporous film having both good mechanical strength and good ion permeability.

The surface porosity of the synthetic resin microporous film can be determined in the following manner. First, a measurement region having a flat rectangular shape of 9.6 μm in width×12.8 μm in length is selected in any section on the surface of the synthetic resin microporous film and photographed at a magnification of ×10,000.

Next, micropore parts formed in the measurement region are enclosed with rectangles whose long sides or short sides are parallel to the longitudinal direction (stretching direction) of the synthetic resin microporous film. The rectangles are adjusted so as to minimize the length of both their long sides and short sides. The area of each rectangle is taken as the opening area of each micropore part. The total opening area S (μm$^2$) of the micropore parts is calculated by summing the opening areas of the micropore parts. The total opening area S (μm$^2$) of the micropore parts is divided by 122.88 μm$^2$ (9.6 μm×12.8 μm) and multiplied by 100 to obtain a surface porosity (%). With regard to micropore parts across the measurement region and the non-measurement region, only part of the micropore parts in the measurement region is targeted for measurement.

The thickness of the synthetic resin microporous film is preferably 5 to 100 μm and more preferably 10 to 50 μm.

In the present invention, the thickness of the synthetic resin microporous film can be determined in the following manner. That is, the thickness is determined at any ten points in the synthetic resin microporous film by using a dial gauge, and the arithmetic mean of the thickness is taken as the thickness of the synthetic resin microporous film.

The synthetic resin microporous film is more preferably an olefin-based resin microporous film produced by a stretching method. The olefin-based resin microporous film produced by a stretching method tends to undergo thermal shrinkage particularly at high temperature due to residual strain generated by stretching. The coating layer of the present invention reduces the thermal shrinkage of the olefin-based resin microporous film, so that the advantageous effects of the present invention are especially obtained.

Specific examples of the method for producing the olefin-based resin microporous film by a stretching method include:

a method (1) including a step of extruding an olefin-based resin to obtain an olefin-based resin film, a step of generating and growing crystalline lamellae in the olefin-based resin film, and a step of stretching the olefin-based resin film and accordingly making spaces between the crystalline lamellae to obtain an olefin-based resin microporous film containing micropore parts;

method (2) including a step of extruding an olefin-based resin composition containing an olefin-based resin and a filler to obtain an olefin-based resin film, and a step of uniaxially stretching or biaxially stretching the olefin-based resin film and accordingly separating the olefin-based resin and the filler to obtain an olefin-based resin microporous film containing micropore parts; and a method (3) including a step of extruding an olefin-based resin composition containing an olefin-based resin and an extractable material (for example, a filler or a plasticizer) to obtain an olefin-based resin film, a step of extracting the extractable material from the olefin-based resin film with a solvent to form micropore parts, and a step of stretching the olefin-based resin film containing the micropore parts to obtain an olefin-based resin microporous film.

Of these methods, the method (1) is preferred because an olefin-based resin microporous film containing many uniform micropore parts is obtained.

(Coating Layer)

The heat-resistant synthetic resin microporous film of the present invention has a coating layer formed on at least part of the surface of the synthetic resin microporous film. The coating layer contains a polymer of a polymerizable compound having two or more radically polymerizable functional groups per molecule. The coating layer containing such a polymer has high hardness as well as appropriate elasticity and appropriate degree of elongation. Therefore, the use of the coating layer containing the above-described polymer can provide the heat-resistant synthetic resin microporous film that has both good mechanical strength, such as piercing strength, and good heat resistance.

The coating layer is formed on at least part of the surface of the synthetic resin microporous film, preferably formed on the entire surface of the synthetic resin microporous film, and more preferably formed on the surface of the synthetic resin microporous film and the wall surfaces of the micropore parts continuous with the surface of the synthetic resin microporous film.

The use of the polymerizable compound allows the coating layer to be formed on the surface of the synthetic resin microporous film without clogging the micropore parts of the synthetic resin microporous film. This can provide the heat-resistant synthetic resin microporous film having good air permeation performance and good ion permeability.

The polymerizable compound has two or more radically polymerizable functional groups per molecule. The radically polymerizable functional group is a functional group containing a radically polymerizable unsaturated bond that can be radically polymerized by irradiation with active energy rays. Examples of the radically polymerizable functional group include, but are not limited to, a (meth)acryloyl group and a vinyl group. A (meth)acryloyl group is preferred.

Examples of the polymerizable compound include polyfunctional acrylic monomers having two or more radically polymerizable functional groups per molecule, vinyl oligomers having two or more radically polymerizable functional groups per molecule, modified polyfunctional (meth) acrylates having two or more (meth)acryloyl groups per molecule, dendritic polymers having two or more (meth) acryloyl groups, and urethane (meth)acrylate oligomers having two or more (meth)acryloyl groups.

In the present invention, the term "(meth)acrylate" refers to acrylate or methacrylate. The term "(meth)acryloyl" refers to acryloyl or methacryloyl. The term "(meth)acrylic acid" refers to acrylic acid or methacrylic acid.

The polyfunctional acrylic monomer has two or more radically polymerizable functional groups per molecule. The polyfunctional acrylic monomer is preferably a tri- or more functional acrylic monomer having three or more radically polymerizable functional groups per molecule, and more preferably a trifunctional to hexafunctional acrylic monomer having three to six radically polymerizable functional groups per molecule.

Examples of the polyfunctional acrylic monomer include bifunctional acrylic monomers, such as 1,9-nonanediol di(meth)acrylate, 1,4-butanediol di(meth)acrylate, 1,6-hexanediol di(meth)acrylate, tripropylene glycol di(meth)acrylate, 2-hydroxy-3-acryloyloxypropyl di(meth)acrylate, ethylene glycol di(meth)acrylate, diethylene glycol di(meth)acrylate, triethylene glycol di(meth)acrylate, 1,10-decanediol di(meth)acrylate, neopentyl glycol di(meth)acrylate, glycerol di(meth)acrylate, tricyclodecane dimethanol di(meth)acrylate;

tri- or more functional acrylic monomers, such as trimethylolpropane tri(meth)acrylate, pentaerythritol tri(meth)acrylate, ethoxylated isocyanuric acid tri(meth)acrylate, ε-caprolactone-modified tris-(2-acryloxyethyl)isocyanurate, and ethoxylated glycerol tri(meth)acrylate;

tetrafunctional acrylic monomers, such as pentaerythritol tetra(meth)acrylate, ditrimethylolpropane tetra(meth)acrylate, and ethoxylated pentaerythritol tetra(meth)acrylate;

pentafunctional acrylic monomers, such as dipentaerythritol penta(meth)acrylate; and hexafunctional acrylic monomers, such as dipentaerythritol hexa(meth)acrylate.

Examples of the vinyl oligomer include, but are not limited to, polybutadiene oligomers. The term "polybutadiene oligomer" refers to an oligomer having a butadiene skeleton. Examples of the polybutadiene oligomer include polymers containing a butadiene component as a monomer component. Examples of the monomer component of the polybutadiene oligomer include a 1,2-butadiene component and a 1,3-butadiene component. Of these, a 1,2-butadiene component is preferred.

The vinyl oligomer may have hydrogen atoms at both terminals of the main chain. The hydrogen atom at each terminal may be substituted by a hydroxy group, a carboxy group, a cyano group, and a hydroxyalkyl group, such as a hydroxyethyl group. The vinyl oligomer may have a radically polymerizable functional group, such as an epoxy group, a (meth)acryloyl group, or a vinyl group, in a side chain or terminal of the molecular chain.

Examples of the polybutadiene oligomer include:

polybutadiene oligomers, such as a poly(1,2-butadiene) oligomer and a poly(1,3-butadiene) oligomer;

epoxidized polybutadiene oligomers in which an epoxy group has been introduced to the molecule by epoxidation of at least part of carbon-carbon double bonds included in the butadiene skeleton; and polybutadiene (meth)acrylate oligomers having a butadiene skeleton and having a (meth)acryloyl group in a side chain or terminal of the main chain.

The polybutadiene oligomer may be a commercially available product. Examples of the poly(1,2-butadiene) oligomer include trade names "B-1000," "B-2000," and "B-3000" available from Nippon Soda Co., Ltd. Examples of the polybutadiene oligomer having hydroxy groups at both terminals of the main chain include trade names "G-1000," "G-2000," and "G-3000" available from Nippon Soda Co., Ltd. Examples of the epoxidized polybutadiene oligomer include trade names "JP-100" and "JP-200" available from Nippon Soda Co., Ltd. Examples of the polybutadiene (meth)acrylate oligomer include trade names "TE-2000," "EA-3000," and "EMA-3000" available from Nippon Soda Co., Ltd.

The modified polyfunctional (meth)acrylate has two or more radically polymerizable functional groups per molecule. The modified polyfunctional (meth)acrylate is preferably a modified tri- or more functional (meth)acrylate having three or more radically polymerizable functional groups per molecule, and more preferably a modified trifunctional to hexafunctional (meth)acrylate having three to six radically polymerizable functional groups per molecule.

Examples of the modified polyfunctional (meth)acrylate include alkylene oxide-modified polyfunctional (meth)acrylate and caprolactone-modified polyfunctional (meth)acrylate.

An alkylene oxide-modified polyfunctional (meth)acrylate is preferably obtained by esterifying an alkylene oxide adduct of polyalcohol with (meth)acrylic acid. A caprolactone-modified polyfunctional (meth)acrylate is preferably obtained by esterifying a caprolactone adduct of polyalcohol with (meth)acrylic acid.

Examples of the polyalcohol for the alkylene oxide-modified product and the caprolactone-modified product include trimethylolpropane, glycerol, pentaerythritol, ditrimethylolpropane, and tris(2-hydroxyethyl)isocyanuric acid.

Examples of the alkylene oxide for the alkylene oxide-modified product include ethylene oxide, propylene oxide, isopropylene oxide, and butylene oxide.

Examples of caprolactone for the caprolactone-modified product include ε-caprolactone, δ-caprolactone, and γ-caprolactone.

In the alkylene oxide-modified polyfunctional (meth)acrylate, the average addition molar number of the alkylene oxide is 1 mol or more per radically polymerizable functional group. The average addition molar number of the alkylene oxide is preferably 1 mol or more and 4 mol or less, and more preferably 1 mol or more and 3 mol or less per radically polymerizable functional group.

Examples of the modified trifunctional (meth)acrylate include alkylene oxide-modified trimethylolpropane tri(meth)acrylates, such as ethylene oxide-modified trimethylolpropane tri(meth)acrylate, propylene oxide-modified trimethylolpropane tri(meth)acrylate, isopropylene oxide-modified trimethylolpropane tri(meth)acrylate, butylene oxide-modified trimethylolpropane tri(meth)acrylate, and ethylene oxide-propylene oxide-modified trimethylolpropane tri(meth)acrylate, and caprolactone-modified trimethylolpropane tri(meth)acrylate;

alkylene oxide-modified glyceryl tri(meth)acrylates, such as ethylene oxide-modified glyceryl tri(meth)acrylate, propylene oxide-modified glyceryl tri(meth)acrylate, isopropylene oxide-modified glyceryl tri(meth)acrylate, butylene oxide-modified glyceryl tri(meth)acrylate, and ethylene oxide-propylene oxide-modified glyceryl tri(meth)acrylate, and caprolactone-modified glyceryl tri(meth)acrylate;

alkylene oxide-modified pentaerythritol tri(meth)acrylates, such as ethylene oxide-modified pentaerythritol tri(meth)acrylate, propylene oxide-modified pentaerythritol tri(meth)acrylate, isopropylene oxide-modified pentaerythritol tri(meth)acrylate, butylene oxide-modified pentaerythritol tri(meth)acrylate, and ethylene oxide-propylene oxide-modified pentaerythritol tri(meth)acrylate, and caprolactone-modified pentaerythritol tri(meth)acrylate; and alkylene oxide-modified tris-(2-acryloxyethyl) isocyanurate, such as ethylene oxide-modified tris-(2-acryloxyethyl) isocyanurate, propylene oxide-modified tris-(2-acryloxyethyl) isocyanurate, isopropylene oxide-modified tris-(2-acryloxyethyl) isocyanurate, butylene oxide-modified tris-(2-acryloxyethyl) isocyanurate, and ethylene oxide-propylene oxide-modified tris-(2-acryloxyethyl) isocyanurate, and caprolactone-modified tris-(2-acryloxyethyl) isocyanurate.

Examples of modified tetrafunctional (meth)acrylates include alkylene oxide-modified pentaerythritol tetra(meth)acrylates, such as ethylene oxide-modified pentaerythritol tetra(meth)acrylate, propylene oxide-modified pentaerythritol tetra(meth)acrylate, isopropylene oxide-modified pentaerythritol tetra(meth)acrylate, butylene oxide-modified pentaerythritol tetra(meth)acrylate, and ethylene oxide-propylene oxide-modified pentaerythritol tetra(meth)acrylate, and caprolactone-modified pentaerythritol tetra(meth)acrylate; and alkylene oxide-modified ditrimethylolpropane tetra(meth)acrylates, such as ethylene oxide-modified ditrimethylolpropane tetra(meth)acrylate, propylene oxide-modified ditrimethylolpropane tetra(meth)acrylate, isopropylene oxide-modified ditrimethylolpropane tetra(meth)acrylate, butylene oxide-modified ditrimethylolpropane tetra(meth)acrylate, and ethylene oxide-propylene oxide-modified ditrimethylolpropane tetra(meth)acrylate, and caprolactone-modified ditrimethylolpropane tetra(meth)acrylate.

Specific examples of modified penta- or more functional (meth)acrylates include alkylene oxide-modified dipentaerythritol poly(meth)acrylates, such as ethylene oxide-modified dipentaerythritol poly(meth)acrylate, propylene oxide-modified dipentaerythritol poly(meth)acrylate, isopropylene oxide-modified dipentaerythritol poly(meth)acrylate, butylene oxide-modified dipentaerythritol poly(meth)acrylate, and ethylene oxide-propylene oxide-modified dipentaerythritol poly(meth)acrylate, and caprolactone-modified dipentaerythritol poly(meth)acrylate.

A commercially available product can also be used as modified polyfunctional (meth)acrylate.

Examples of the ethylene oxide-modified trimethylolpropane tri(meth)acrylate include trade names "SR454," "SR499," and "SR502" available from Sartomer Company, Inc.; trade name "Viscoat #360" available from Osaka Organic Chemical Industry Ltd.; and trade names "Miramer M3130," "Miramer M3160," and "Miramer M3190" available from Miwon Specialty Chemical Co., Ltd. Examples of the propylene oxide-modified trimethylolpropane tri(meth)acrylate include trade names "SR492" and "CD501" available from Sartomer Company, Inc., and trade name "Miramer M360" available from Miwon Specialty Chemical Co., Ltd. Examples of the isopropylene oxide-modified trimethylolpropane tri(meth)acrylate include trade name "TPA-330" available from Nippon Kayaku Co., Ltd.

Examples of the ethylene oxide-modified glyceryl tri(meth)acrylate include trade names "A-GYL-3E" and "A-GYL-9E" available from Shin-Nakamura Chemical Co., Ltd. Examples of the propylene oxide-modified glyceryl tri(meth)acrylate include trade names "SR9020" and "CD9021" available from Sartomer Company, Inc. Examples of the isopropylene oxide-modified glyceryl tri(meth)acrylate include trade name "GPO-303" available from Nippon Kayaku Co., Ltd.

Examples of the caprolactone-modified tris-(2-acryloxyethyl) isocyanurate include trade names "A-9300-1CL" and "A-9300-3CL" available from Shin-Nakamura Chemical Co., Ltd.

Examples of the ethylene oxide-modified pentaerythritol tetra(meth)acrylate include trade name "Miramer M4004" available from Miwon Specialty Chemical Co., Ltd. Examples of the ethylene oxide-modified ditrimethylolpropane tetra(meth)acrylate include trade name "AD-TMP-4E" available from Shin-Nakamura Chemical Co., Ltd.

Examples of the ethylene oxide-modified dipentaerythritol polyacrylate include trade name "A-DPH-12E" available from Shin-Nakamura Chemical Co., Ltd. Examples of the isopropylene oxide-modified dipentaerythritol polyacrylate include trade name "A-DPH-6P" available from Shin-Nakamura Chemical Co., Ltd.

The term "dendritic polymer having two or more (meth)acryloyl groups per molecule" refers to a spherical macromolecule having a radial assembly of branched molecules having a (meth)acryloyl group.

Examples of the dendritic polymer having (meth)acryloyl groups include dendrimers having two or more (meth)acryloyl groups per molecule, and hyperbranched polymers having two or more (meth)acryloyl groups per molecule.

The term "dendrimer" refers to a spherical polymer obtained by spherically assembling a (meth)acrylate, which is used as a branched molecule.

Any dendrimer can be used as long as the dendrimer has two or more (meth)acryloyl groups per molecule. The dendrimer is preferably a tri- or more functional dendrimer having three or more (meth)acryloyl groups per molecule and more preferably a polyfunctional dendrimer having 5 to 20 (meth)acryloyl groups per molecule.

The weight average molecular weight of the dendrimer is preferably 1,000 to 50,000, and more preferably 1,500 to 25,000. The dendrimer having the weight average molecular weight in the above-described range can provide the bonding density in the dendrimer molecule and the bonding density between the dendrimer molecules "high" and "low," respectively, which allows formation of the coating layer having high hardness as well as appropriate elasticity and appropriate degree of elongation.

The weight average molecular weight of the dendrimer is a polystyrene-equivalent value obtained by using gel permeation chromatography (GPC).

A commercially available product can also be used as a dendritic polymer having two or more (meth)acryloyl groups per molecule. Examples of the dendrimer having two or more (meth)acryloyl groups per molecule include trade names "CN2302," "CN2303," and "CN2304" available from Sartomer Company, Inc.; trade names "V1000," "SUBARU-501," and "SIRIUS-501" available from Osaka Organic Chemical Industry Ltd.; and trade name "A-HBR-5" available from Shin-Nakamura Chemical Co., Ltd.

The term "hyperbranched polymer having two or more (meth)acryloyl groups per molecule" refers to a spherical polymer obtained by modifying, with a (meth)acryloyl group, the surface and inside of a highly branched structure body having an irregularly branched structure obtained by polymerizing an ABx-type polyfunctional monomer (where A and B are functional groups that react with each other, and x, which is the number of B, is 2 or more).

Urethane (meth)acrylate oligomers having (meth)acryloyl groups have two or more (meth)acryloyl groups per molecule.

A urethane acrylate oligomer is obtained by, for example, causing reactions of a polyisocyanate compound, a (meth)acrylate having a hydroxyl group or an isocyanate group, and a polyol compound.

Examples of the urethane acrylate oligomer include (1) a urethane acrylate obtained by causing a reaction between a (meth)acrylate having a hydroxyl group and a terminal isocyanate group-containing urethane prepolymer obtained by causing a polyol compound and a polyisocyanate compound to react with each other, and (2) a urethane acrylate oligomer obtained by causing a reaction between a (meth) acrylate having an isocyanate group and a terminal hydroxyl group-containing urethane prepolymer obtained by causing a polyol compound and a polyisocyanate compound to react with each other.

Examples of the polyisocyanate compound include isophorone diisocyanate, 2,4-tolylene diisocyanate, 2,6-tolylene diisocyanate, 1,3-xylylene diisocyanate, 1,4-xylylene diisocyanate, and diphenylmethane-4,4'-diisocyanate. Examples of the (meth)acrylate having a hydroxyl group include 2-hydroxyethyl (meth)acrylate, 2-hydroxypropyl (meth)acrylate, 2-hydroxybutyl (meth)acrylate, 4-hydroxybutyl (meth)acrylate, and polyethylene glycol (meth)acrylate. Examples of the (meth)acrylate having an isocyanate group include methacryloyloxyethyl isocyanate.

Examples of the polyol compound include polyol compounds, such as alkylene-type polyol compounds, polycarbonate-type polyol compounds, polyester-type polyol compounds, and polyether-type polyol compounds. Specific examples include polyethylene glycol, polypropylene glycol, polytetramethylene glycol, polycarbonate diols, polyester diols, and polyether diols.

A commercially available product can also be used as a urethane (meth)acrylate oligomer having two or more (meth)acryloyl groups per molecule. Examples of the commercially available product include trade name "UA-122P" available from Shin-Nakamura Chemical Co., Ltd.; trade name "UF-8001G" available from Kyoeisha Chemical Co., Ltd.; trade names "CN977," "CN999," "CN963," "CN985," "CN970," "CN133," "CN975," and "CN997" available from Sartomer Company, Inc.; trade name "IRR214-K" available from Daicel-Allnex Ltd.; and trade names "UX-5000," "UX-5102D-M20," "UX-5005," and "DPHA-40H" available from Nippon Kayaku Co., Ltd. As the polymerizable compound, an aliphatic special oligomer, such as trade name "CN113" available from Sartomer Company, Inc. can also be used.

In the present invention, among the above-mentioned polymerizable compounds, polyfunctional acrylic monomers are preferred, and trimethylolpropane tri(meth)acrylate, pentaerythritol tri(meth)acrylate, pentaerythritol tetra(meth)acrylate, dipentaerythritol hexa(meth)acrylate, and ditrimethylolpropane tetra(meth)acrylate are preferred. These compounds can impart good heat resistance to the heat-resistant synthetic resin microporous film without reducing mechanical strength.

When a polyfunctional acrylic monomer is used as the polymerizable compound, the amount of the polyfunctional acrylic monomer in the polymerizable compound is preferably 30% by weight or more, more preferably 80% by weight or more, and particularly preferably 100% by weight. The use of the polymerizable compound containing 30% by weight or more of the polyfunctional acrylic monomer can impart good heat resistance to the resulting heat-resistant synthetic resin microporous film without reducing air permeation performance.

In the present invention, the above-mentioned polymerizable compounds may be used alone or in combination of two or more as the polymerizable compound.

The coating layer contains a polymer of the polymerizable compound described above. The polymer is preferably a polymer obtained by polymerizing the polymerizable compound by irradiation with active energy rays. The coating layer containing such a polymer has high hardness and thus reduces the thermal shrinkage of the heat-resistant synthetic resin microporous film under high temperature to improve heat resistance.

Examples of the active energy ray include, but are not limited to, an electron beam, plasma, ultraviolet rays, $\alpha$-rays, $\beta$-rays, and $\gamma$-rays. Of these, an electron beam and ultraviolet rays are preferred.

Part of the polymer in the coating layer and part of the synthetic resin in the synthetic resin microporous film are preferably chemically bonded to each other. The use of the coating layer containing such a polymer can provide the heat-resistant synthetic resin microporous film that exhibits reduced thermal shrinkage under high temperature and thus has good heat resistance as described above. Examples of the chemical bonding include, but are not limited to, covalent bonding, ionic bonding, and intermolecular bonding.

The amount of the coating layer in the heat-resistant synthetic resin microporous film is preferably 5 to 80 parts by weight, more preferably 5 to 60 parts by weight, and particularly preferably 10 to 40 parts by weight with respect to 100 parts by weight of the synthetic resin microporous film. The amount of the coating layer in the above-described range allows uniform formation of the coating layer on the surface of the synthetic resin microporous film without clogging the micropore parts. This can provide the heat-resistant synthetic resin microporous film having improved heat resistance without reducing air permeation performance.

The thickness of the coating layer is preferably, but not specifically limited to, 1 to 100 nm, and more preferably 5 to 50 nm. The thickness of the coating layer in the above-described range allows uniform formation of the coating layer on the surface of the synthetic resin microporous film without clogging the micropore parts. This can provide the heat-resistant synthetic resin microporous film having improved heat resistance without reducing air permeation performance.

The coating layer even free of inorganic particles can improve the heat resistance of the heat-resistant synthetic resin microporous film. Thus, the coating layer is preferably free of inorganic particles. However, the coating layer may contain inorganic particles as desired. Examples of the inorganic particles include inorganic particles commonly used in a heat-resistant porous layer. Examples of the material of the inorganic particles include $Al_2O_3$, $SiO_2$, $TiO_2$, and MgO.

(Heat-Resistant Synthetic Resin Microporous Film)

The heat-resistant synthetic resin microporous film of the present invention includes the synthetic resin microporous film, and the coating layer formed on at least part of the surface of the synthetic resin microporous film, as described above.

The maximum thermal shrinkage rate of the heat-resistant synthetic resin microporous film, when the heat-resistant synthetic resin microporous film is heated from 25° C. to 180° C. at a temperature rising rate of 5° C./min, is 15% or less, preferably 5 to 15%, and more preferably 8 to 13%. Since the thermal shrinkage of the heat-resistant synthetic resin microporous film under high temperature is reduced by the coating layer, the heat-resistant synthetic resin microporous film has good heat resistance. Therefore, the maximum thermal shrinkage rate of the heat-resistant synthetic resin microporous film can be controlled at 15% or less.

The maximum thermal shrinkage rate of the heat-resistant synthetic resin microporous film can be determined in the following manner. First, the heat-resistant synthetic resin microporous film is cut into a specimen having a flat rectangular shape (3 mm in width×30 mm in length). At this time, the longitudinal direction (extrusion direction) of the heat-resistant synthetic resin microporous film is parallel to the longitudinal direction of the specimen. The both ends of the specimen in the longitudinal direction are supported by jigs and attached to a TMA measuring device (for example, trade name "TMA-SS6000" available from Seiko Instruments Inc.). At this time, the distance between the jigs is 10 mm, and the jigs can move in accordance with the thermal shrinkage of the specimen. Then, the specimen is heated from 25° C. to 180° C. at a temperature rising rate of 5° C./min while a tension of 19.6 mN (2 gf) is applied to the specimen in the longitudinal direction. The distance L (mm) between the jigs is determined at each temperature. The thermal shrinkage rate is calculated on the basis of the following formula, and the maximum value is taken as the maximum thermal shrinkage rate.

Thermal shrinkage rate (%)=100×(10−L)/10

The piercing strength of the heat-resistant synthetic resin microporous film is 0.6 N or more, preferably 0.8 N or more, and more preferably 1.0 to 1.2 N. The heat-resistant synthetic resin microporous film having a piercing strength of 0.6 N or more has good mechanical strength and accordingly can improve the productivity and safety of the battery.

The rate of retention of the piercing strength of the heat-resistant synthetic resin microporous film after heating the heat-resistant synthetic resin microporous film at 70° C. for 168 hours is 85% or more, and more preferably 90% or more. The heat-resistant synthetic resin microporous film having a rate of retention of the piercing strength of 85% or more exhibits a suppressed decrease in mechanical strength over time and thus maintains good mechanical strength for a long time.

In the present invention, the piercing strength of the heat-resistant synthetic resin microporous film can be determined in accordance with JIS 21707 (1998). Specifically, a needle having a diameter of 1.0 mm and having a semicircular tip with a radius of 0.5 mm is caused to pierce the heat-resistant synthetic resin microporous film at a rate of 50 mm/min, and the maximum stress until the needle pierces through the film is taken as the piercing strength.

The piercing strength $S_1$ [N] of the heat-resistant synthetic resin microporous film before heating and the piercing strength $S_2$ [N] of the heat-resistant synthetic resin microporous film after heating at 70° C. for 168 hours are determined in the above-mentioned manner. The rate of retention of the piercing strength [%] can be calculated in accordance with the following formula.

Rate of retention of piercing strength[%]=100×$S_2$/$S_1$

The air permeability of the heat-resistant synthetic resin microporous film is preferably, but not specifically limited to, 50 to 600 sec/100 mL, and more preferably 100 to 300 sec/100 mL. In the heat-resistant synthetic resin microporous film, as described above, forming the coating layer reduces clogging of the micropore parts in the synthetic resin microporous film, which reduces a decrease in air permeation performance due to the formation of the coating layer. Therefore, the air permeability of the heat-resistant synthetic resin microporous film can be controlled in the above-described range. The heat-resistant synthetic resin microporous film having an air permeability in the above-described range has good ion permeability.

As a method for determining the air permeability of the heat-resistant synthetic resin microporous film, the same method as the above-mentioned method for determining the air permeability of the synthetic resin microporous film is used.

The surface porosity of the heat-resistant synthetic resin microporous film is preferably, but not specifically limited to, 30 to 55%, and more preferably 30 to 50%. As described above, the formation of the coating layer reduces clogging of the micropore parts in the synthetic resin microporous film. Thus, the surface porosity of the heat-resistant synthetic resin microporous film can be controlled in the above-described range. The heat-resistant synthetic resin microporous film having a surface porosity in the above-described range has both good mechanical strength and good ion permeability.

As a method for determining the surface porosity of the synthetic resin microporous film, the same method as the above-mentioned method for determining the surface porosity of the synthetic resin microporous film is used.

The radical quantity in the heat-resistant synthetic resin microporous film is preferably $2.0\times10^{16}$ spins/100 mg or less, more preferably $2.0\times10^{14}$ to $2.0\times10^{16}$ spins/100 mg, and particularly preferably $2.0\times10^{14}$ to $2.0\times10^{15}$ spins/100 mg. Reducing the radical quantity can suppress a decrease in the mechanical strength of the heat-resistant synthetic resin microporous film over time due to residual radicals.

The radical quantity in the heat-resistant synthetic resin microporous film is a value determined by an electron spin resonance (ESR) method. The radical quantity in the heat-resistant synthetic resin microporous film can be determined in the following manner. First, 80 mg of the heat-resistant synthetic resin microporous film, which is used as a sample, is placed in an X-band measurement quartz sample tube (10 cm in length, 4 mm in diameter). Then, the measurement is performed on the sample at room temperature by using an electron spin resonance (ESR) measurement device (for example, trade name "FA-200" available from JEOL Ltd.). Signals from the sample are monitored by checking the resonance dip of the microwave. The measurement is performed in the following conditions.

Output: 1.01 mW
Center magnetic field: 336 mT
Sweep width: ±10 mT
Sweep time: 4 min
Modulation width (FMW): 0.6 mT
Gain: ×20
Time constant: 0.03 sec
Cumulative number: 1 time
Number of data points: 8192
Mn2+ digital marker setting: 850
Standard substance: TEMPOL (4-hydroxy-2,2,6,6-tetramethyl piperidine-1-oxyl)

<Data Processing Conditions>

Baseline correction: corrected by two signals, third and fourth signals from Mn2+

Signal wave height ratio: expressed as the ratio of the wave height of Mn2+ (fourth signal), which is used as reference because Mn2+ (third signal) overlaps with the signal from the sample, to the signal wave height of the sample. After the signal wave height ratio (S) from the sample is obtained, the signal wave height ratio (corrected signal wave height ratio) supposed that the sample weight is 100 mg is obtained from the previously determined weight (Ws) of the sample in accordance with the following formula (1).

Corrected signal wave height ratio=S×(100/Ws)   (1)

Number of spins: The number of spins contributing to the third signal from Mn2+ is obtained by using TEMPOL as a standard substance when a Mn2+ digital marker is set to 850. The number of spins of the sample is calculated from the relative intensity of the third signal from Mn2+ to the signal from the measurement sample. The number of spins per 100 mg of the sample is also obtained.

g value: The g value is calculated by a calculation program from the g values of the third and fourth signals from Mn2+, a magnetic field interval, and the central magnetic field of the signal from the sample.

(Method for Producing Heat-Resistant Synthetic Resin Microporous Film)

A method for producing the heat-resistant synthetic resin microporous film of the present invention includes the following steps:

an applying step of applying a polymerizable compound having two or more radically polymerizable functional groups per molecule to at least part of the surface of a synthetic resin microporous film;

an irradiating step of irradiating, with active energy rays at an irradiation dose of 40 to 70 kGy, the synthetic resin microporous film to which the polymerizable compound has been applied; and a heating step of heating, in an atmosphere having an oxygen concentration of 300 ppm or less, the synthetic resin microporous film irradiated with the active energy rays.

(Applying Step)

The method of the present invention first involves performing the applying step of applying a polymerizable compound having two or more radically polymerizable functional groups per molecule to at least part of the surface of a synthetic resin microporous film.

The polymerizable compound can be attached to the surface of the synthetic resin microporous film by applying the polymerizable compound to the surface of the synthetic resin microporous film. At this time, the polymerizable compound may be applied to the surface of the synthetic resin microporous film as it is. However, preferably, the polymerizable compound is dispersed or dissolved in a solvent to obtain an application liquid, and this application liquid is applied to the surface of the synthetic resin microporous film. The use of the polymerizable compound as an application liquid in this manner allows the polymerizable compound to be uniformly attached to the surface of the synthetic resin microporous film while reducing clogging of the micropore parts. The resulting coating layer is uniformly formed accordingly, which enables production of the heat-resistant synthetic resin microporous film having improved heat resistance without reducing air permeation performance.

Furthermore, the application liquid can flow smoothly on the wall surfaces of the micropore parts in the synthetic resin microporous film, so that the coating layer can be formed not only on the surface of the synthetic resin microporous film but also on the wall surfaces of the opening ends of the micropore parts continuous with the surface. Consequently, the coating layer can be strongly integrated with the surface of the synthetic resin microporous film.

Since the polymerizable compound having two or more radically polymerizable functional groups has good compatibility with the synthetic resin microporous film, the polymerizable compound can be applied to the synthetic resin microporous film without clogging the micropore parts. This enables formation of the coating layer having through-holes that penetrate through the coating layer in the thickness direction in parts corresponding to the micropore parts of the synthetic resin microporous film. Therefore, such a coating layer can provide the heat-resistant synthetic resin microporous film having improved heat resistance without reducing air permeation performance.

The solvent used for the application liquid is not limited to particular ones as long as the polymerizable compound can be dissolved or dispersed therein. Examples of the solvent include alcohols such as methanol, ethanol, propanol, and isopropyl alcohol; ketones such as acetone, methyl ethyl ketone, and methyl isobutyl ketone; ethers, such as tetrahydrofuran and dioxane; ethyl acetate; and chloroform. Of these, ethyl acetate, ethanol, methanol, and acetone are preferred. These solvents can be smoothly removed after applying the application liquid to the surface of the synthetic resin microporous film. Furthermore, the above-mentioned solvents are highly safe because of low reactivity with an electrolyte solution constituting secondary batteries, such as lithium-ion secondary batteries.

The amount of the polymerizable compound in the application liquid is preferably 3 to 20% by weight and more preferably 5 to 15% by weight. The amount of the polymerizable compound in the above-described range allows uniform formation of the coating layer on the surface of the synthetic resin microporous film without clogging the micropore parts. Thus, the heat-resistant synthetic resin microporous film having improved heat resistance can be produced without reducing air permeation performance.

Examples of the method for applying the polymerizable compound to the surface of the synthetic resin microporous film include, but are not limited to, a method (1) of applying the polymerizable compound to the surface of the synthetic resin microporous film; a method (2) of applying the polymerizable compound to the surface of the synthetic resin microporous film by immersing the synthetic resin microporous film in the polymerizable compound; a method (3) including preparing an application liquid by dissolving or dispersing the polymerizable compound in a solvent, applying the application liquid to the surface of the synthetic resin microporous film, and then removing the solvent by heating the synthetic resin microporous film; and a method (4) including preparing an application liquid by dissolving or dispersing the polymerizable compound in a solvent, applying the application liquid to the synthetic resin microporous film by immersing the synthetic resin microporous film in the application liquid, and then removing the solvent by heating the synthetic resin microporous film. Of these methods, the methods (3) and (4) are preferred. By these methods, the polymerizable compound can be uniformly applied to the surface of the synthetic resin microporous film.

In the methods (3) and (4), the temperature at which the synthetic resin microporous film is heated to remove the solvent can be set according to the type and boiling point of the solvent used. The temperature at which the synthetic resin microporous film is heated to remove the solvent is preferably 50 to 140° C., and more preferably 70 to 130° C. The heating temperature in the above-described range enables effective removal of the applied solvent while the thermal shrinkage of the synthetic resin microporous film and clogging of the micropore parts are reduced.

In the methods (3) and (4), the time during which the synthetic resin microporous film is heated to remove the solvent is not limited and can be set according to the type and boiling point of the solvent used. The time during which the synthetic resin microporous film is heated to remove the solvent is preferably 0.02 to 60 minutes, and more preferably 0.1 to 30 minutes.

As described above, the polymerizable compound can be attached to the surface of the synthetic resin microporous film by applying the polymerizable compound or the application liquid to the surface of the synthetic resin microporous film.

(Irradiating Step)

The method of the present invention next involves performing the irradiating step of irradiating, with active energy rays, the synthetic resin microporous film to which the polymerizable compound has been applied. This irradiating step induces polymerization of the polymerizable compound and causes the coating layer containing a polymer of the polymerizable compound to integrally form on at least part of the surface, preferably the entire surface, of the synthetic resin microporous film.

The irradiation with active energy rays may decompose part of the synthetic resin contained in the synthetic resin microporous film to reduce the mechanical strength, such as tearing strength, of the synthetic resin microporous film. However, the coating layer containing a polymer of a polymerizable compound compensates for a decrease in the mechanical strength of the synthetic resin microporous film as described above. This provides the heat-resistant synthetic resin microporous film having both good mechanical strength and good heat resistance.

The irradiation dose of the active energy rays on the synthetic resin microporous film is 40 to 70 kGy, preferably 40 to 60 kGy, and more preferably 45 to 55 kGy. The irradiation dose of the active energy rays in the above-described range allows polymerization of the polymerizable compound while reducing deterioration of the synthetic resin in the synthetic resin microporous film. This provides the heat-resistant synthetic resin microporous film having both good mechanical strength and good heat resistance.

Examples of the active energy ray include, but are not limited to, an electron beam, plasma, ultraviolet rays, α-rays, β-rays, and γ-rays. Of these, an electron beam and ultraviolet rays are preferred.

When an electron beam is used as an active energy ray, the accelerating voltage of the electron beam applied onto the synthetic resin microporous film is preferably, but not specifically limited to, 50 to 300 kV and more preferably 100 to 250 kV. The accelerating voltage of the electron beam in the above-described range allows formation of the coating layer while reducing deterioration of the synthetic resin in the synthetic resin microporous film.

When ultraviolet rays are used as active energy rays, the cumulative dose of ultraviolet rays on the synthetic resin microporous film is preferably 1000 to 5000 mJ/cm$^2$, more preferably 1000 to 4000 mJ/cm$^2$, and particularly preferably 1500 to 3700 mJ/cm$^2$. When ultraviolet rays are used as active energy rays, the application liquid preferably contains a photopolymerization initiator. Examples of the photopolymerization initiator include benzophenone, benzyl, methyl-o-benzoylbenzoate, and anthraquinone.

When plasma is used as an active energy ray, the plasma energy density on the synthetic resin microporous film is preferably, but not specifically limited to, 5 to 50 J/cm$^2$, more preferably 10 to 45 J/cm$^2$, and particularly preferably 20 to 45 J/cm$^2$.

In the irradiating step, the synthetic resin microporous film to which the polymerizable compound has been applied is preferably irradiated with the active energy rays in an atmosphere having an oxygen concentration of 300 ppm or less. The oxygen concentration in the atmosphere in the irradiating step is preferably 300 ppm or less, more preferably 100 to 0 ppm, and still more preferably 10 to 0 ppm. When the irradiating step is performed in the atmosphere having such an oxygen concentration, residual radicals even if produced in the polymerization reaction of the polymerizable compound can be trapped by oxygen. This suppresses a decrease over time in the mechanical strength of the heat-resistant synthetic resin microporous film due to residual radicals.

The irradiating step is preferably performed in an inert gas atmosphere. This makes it easy to control the oxygen concentration in the atmosphere in the irradiating step. Examples of the inert gas include, but are not limited to, nitrogen, helium, neon, argon, krypton, xenon, radon, and a mixed gas thereof.

<Heating Step>

The method of the present invention next involves performing a heating step of heating, in an atmosphere having an oxygen concentration of 300 ppm or less, the synthetic resin microporous film irradiated with the active energy rays. The heating step can deactivate the residual radicals, which have been produced in the synthetic resin microporous film in the irradiating step described above. This suppresses a decrease over time in the mechanical strength of the heat-resistant synthetic resin microporous film.

In the heating step, the synthetic resin microporous film irradiated with the active energy rays is preferably heated preferably at 90 to 150° C., more preferably at 110 to 150° C., and particularly preferably at 130 to 150° C. The heating temperature for the synthetic resin microporous film in the above-described range allows deactivation of the residual radicals while reducing deterioration of the synthetic resin in the synthetic resin microporous film.

In the heating step, the heating time for the synthetic resin microporous film irradiated with the active energy rays is preferably 2 minutes to 3 hours, and more preferably 20 minutes to 3 hours. The heating time for the synthetic resin microporous film in the above-described range allows deactivation of the residual radicals while reducing deterioration of the synthetic resin in the synthetic resin microporous film.

In the heating step, the synthetic resin microporous film irradiated with the active energy rays is heated in an atmosphere having an oxygen concentration of 300 ppm or less. The oxygen concentration in the atmosphere in the heating step is 300 ppm or less, preferably 100 to 0 ppm, and more preferably 10 to 0 ppm. When the heating step is performed in the atmosphere having such an oxygen concentration, the synthetic resin contained in the synthetic resin microporous film is less subject to oxidative degradation in the heating step. This suppresses a decrease over time in the mechanical strength of the heat-resistant synthetic resin microporous film due to the breakage of the molecular chains of the synthetic resin.

The heating step is preferably performed in an inert gas atmosphere. This makes it easy to control the oxygen concentration in the atmosphere in the heating step. Examples of the inert gas include, but are not limited to, nitrogen, helium, neon, argon, krypton, xenon, radon, and a mixed gas thereof.

The heat-resistant synthetic resin microporous film of the present invention is suitably used as a non-aqueous electrolyte solution secondary battery separator. Examples of the non-aqueous electrolyte solution secondary battery include lithium-ion secondary batteries. Since the heat-resistant synthetic resin microporous film of the present invention has good heat resistance, the use of the heat-resistant synthetic resin microporous film can reduce occurrence of an electrical short circuit between the electrodes due to the shrinkage of the heat-resistant synthetic resin microporous film even when the temperature inside the battery increases to, for example, 100 to 150° C., particularly 130 to 150° C. Furthermore, the heat-resistant synthetic resin microporous film of the present invention also has good mechanical strength and can maintain such good mechanical strength for a long period of time, which ensures the good productivity and safety of the non-aqueous electrolyte solution secondary battery.

The non-aqueous electrolyte solution secondary battery is not particularly limited as long as it includes the heat-resistant synthetic resin microporous film of the present invention as a separator. The non-aqueous electrolyte solution secondary battery includes a positive electrode, a negative electrode, a separator including the heat-resistant synthetic resin microporous film, and a non-aqueous electrolyte solution. The heat-resistant synthetic resin microporous film is disposed between the positive electrode and the negative electrode, and accordingly can prevent an electrical short circuit between the electrodes. At least the micropore parts of the heat-resistant synthetic resin microporous film are filled with the non-aqueous electrolyte solution, which allows lithium ions to move between the electrodes during charging and discharging.

The positive electrode preferably, but not necessarily, includes a positive electrode current collector and a positive electrode active material layer formed on at least one surface of the positive electrode current collector. The positive electrode active material layer preferably contains a positive electrode active material and voids formed in the positive electrode active material. When the positive electrode active material layer contains voids, the voids are also filled with the non-aqueous electrolyte solution. The positive electrode active material is a material that can occlude and deocclude lithium ions or the like. Examples of the positive electrode active material include lithium cobalt oxide and lithium manganese oxide. Examples of the current collector used in the positive electrode include an aluminum foil, a nickel foil, and a stainless steel foil. The positive electrode active material layer may further contain a binder, a conductive auxiliary agent, and the like.

The negative electrode preferably, but not necessarily, includes a negative electrode current collector and a negative electrode active material layer formed on at least one surface of the negative electrode current collector. The negative electrode active material layer preferably contains a negative electrode active material and voids formed in the negative electrode active material. When the negative electrode active material layer contains voids, the voids are also filled with the non-aqueous electrolyte solution. The negative electrode active material is a material that can occlude and deocclude lithium ions or the like. Examples of the negative electrode active material include graphite, carbon black, acetylene black, and Ketjenblack. Examples of the current collector used in the negative electrode include a copper foil, a nickel foil, and a stainless steel foil. The negative electrode active material layer may further contain a binder, a conductive auxiliary agent, and the like.

The non-aqueous electrolyte solution is an electrolyte solution in which an electrolyte salt is dissolved in a water-free solvent. Examples of the non-aqueous electrolyte solution used in a lithium-ion secondary battery include a non-aqueous electrolyte solution in which a lithium salt is dissolved in an aprotic organic solvent. Examples of the aprotic organic solvent include solvent mixtures of cyclic carbonates, such as propylene carbonate and ethylene carbonate, and linear carbonates, such as diethyl carbonate, methyl ethyl carbonate, and dimethyl carbonate. Examples of the lithium salt include $LiPF_6$, $LiBF_4$, $LiClO_4$, and $LiN(SO_2CF_3)_2$.

EXAMPLES

The present invention will be described below in more detail by way of Examples, but the present invention is not limited thereto.

Example 1

(Extruding Step)

A homopolypropylene (weight average molecular weight: 413,000, molecular weight distribution: 9.3, melting point: 163° C., heat of fusion: 96 mJ/mg) was supplied to an extruder and melt-kneaded at a resin temperature of 200° C. The melt-kneaded homopolypropylene was extruded from a T-die attached to the tip of the extruder and cooled until the surface temperature reached 30° C., which provided a homopolypropylene film (thickness: 30 μm). The extrusion rate was 9 kg/h, the film forming speed was 22 m/min, and the draw ratio was 83.

(Curing Step)

The obtained homopolypropylene film was cured by allowing it to stand for 24 hours in an air-heating furnace containing an atmosphere with a temperature of 150° C.

(First Stretching Step)

The homopolypropylene film after curing was cut in a strip shape of 300 mm in the extrusion direction (longitudinal direction) and 160 mm in the width direction. This homopolypropylene film was uniaxially stretched in only the extrusion direction with a uniaxial stretching device at a stretching speed of 50%/min and a stretching ratio of 1.20 while the surface temperature was controlled at 23° C.

(Second Stretching Step)

Subsequently, the homopolypropylene film was uniaxially stretched in only the extrusion direction with a uniaxial stretching device at a stretching speed of 42%/min and a stretching ratio of 2 while the surface temperature was controlled at 120° C.

(Annealing Step)

Next, annealing was performed on the homopolypropylene film by allowing the homopolypropylene film to stand for 10 minutes such that the surface temperature thereof reached 130° C. and no tension was applied to the homopolypropylene film. As a result, a homopolypropylene microporous film (thickness: 25 μm) having micropore parts was obtained. The shrinkage percentage of the homopolypropylene film in annealing was set to 20%.

In the obtained homopolypropylene microporous film, the air permeability was 110 sec/100 mL, the surface porosity was 40%, the maximum major diameter of opening ends of the micropore parts was 600 nm, the average major diameter of the opening ends of the micropore parts was 360 nm, and the pore density was 30 pores/μm².

(Applying Step)

An application liquid containing 90% by weight of ethyl acetate as a solvent and 10% by weight of trimethylolpropane triacrylate (trade name "LIGHT ACRYLATE TMP-A" available from Kyoeisha Chemical Co., Ltd.) as a polymerizable compound was prepared. Next, this application liquid was applied to the surface of the homopolypropylene microporous film. The homopolypropylene microporous film was then heated at 80° C. for 2 minutes to remove the solvent. As a result, the polymerizable compound was allowed to adhere to the entire surface of the homopolypropylene microporous film.

(Irradiating Step)

Next, in a glove box ("Labmaster130" available from M Braun) in which the oxygen concentration was controlled at 1 ppm or less, the homopolypropylene microporous film was placed in a bag formed of a polyethylene terephthalate film (thickness: 25 μm) and the opening of the bag was hermetically sealed. The oxygen concentration in the sealed bag was 1 ppm or less. The homopolypropylene microporous film in this sealed bag was irradiated with an electron beam at an accelerating voltage of 110 kV and an irradiation dose of 50 kGy to polymerize the polymerizable compound.

<Heating Step>

Subsequently, the homopolypropylene microporous film in the sealed bag was heated in an oven at 120° C. for 1 hour. The oxygen concentration in the sealed bag was 1 ppm or less. This provided a heat-resistant homopolypropylene microporous film in which a coating layer containing a polymer of the polymerizable compound was formed on the surface of the homopolypropylene microporous film and the wall surfaces of the opening ends of the micropore parts continuous with the surface of the homopolypropylene microporous film.

Example 2

A heat-resistant homopolypropylene microporous film was obtained in the same manner as in Example 1 except that the oxygen concentration in the glove box was 200 ppm in the irradiating step and the oxygen concentration in the sealed bag was 200 ppm in the irradiating step and the heating step.

Example 3

A heat-resistant homopolypropylene microporous film was obtained in the same manner as in Example 1 except that the oxygen concentration in the glove box was 300 ppm in the irradiating step and the oxygen concentration in the sealed bag was 300 ppm in the irradiating step and the heating step.

Comparative Example 1

A heat-resistant homopolypropylene microporous film was obtained in the same manner as in Example 1 except that the irradiating step and the heating step were performed in the manner described below.

(Irradiating Step)

The homopolypropylene microporous film in an atmosphere having an oxygen concentration of 300 ppm was irradiated with an electron beam at an accelerating voltage of 110 kV and an irradiation dose of 50 kGy to polymerize the polymerizable compound.

(Applying Step)

Subsequently, the homopolypropylene microporous film was heated in an oven at 120° C. for 1 hour. At this time, air was circulated in the oven, and the oxygen concentration in the oven was controlled at $2.1 \times 10^5$ ppm. This provided a heat-resistant homopolypropylene microporous film in which a coating layer containing a polymer of the polymerizable compound was formed on the surface of the homopolypropylene microporous film and the wall surfaces of the opening ends of micropore parts continuous with the surface of the homopolypropylene microporous film.

Comparative Example 2

A heat-resistant homopolypropylene microporous film was obtained in the same manner as in Example 1 except that the irradiation dose of the electron beam was 30 kGy in the irradiating step.

Comparative Example 3

A heat-resistant homopolypropylene microporous film was obtained in the same manner as in Example 1 except that the irradiation dose of the electron beam was 80 kGy in the irradiating step.

[Evaluation]

The piercing strength, the air permeability, the surface porosity, and the radical quantity of the heat-resistant synthetic resin microporous film were determined in accordance with the procedures described above, respectively. The maximum thermal shrinkage rate of the heat-resistant synthetic resin microporous film when heated from 25° C. to 180° C. at a temperature rising rate of 5° C./min was determined in accordance with the procedure described above. In addition, the rate of retention of the piercing strength of the heat-resistant synthetic resin microporous film after heating the heat-resistant synthetic resin microporous film at 70° C. for 168 hours was determined in accordance with the procedure described above. These results are shown in Table 1. The amount of the coating layer in the heat-resistant homopolypropylene microporous film with respect to 100 parts by weight of the homopolypropylene microporous film is also shown in Table 1.

TABLE 1

|  |  | Example 1 | Example 2 | Example 3 | Comparative Example 1 | Comparative Example 2 | Comparative Example 3 |
|---|---|---|---|---|---|---|---|
| Irradiating Step | Oxygen concentration [ppm] | 1 or less | 200 | 300 | 300 | 1 or less | 1 or less |
|  | Accelerating voltage [kV] | 110 | 110 | 110 | 110 | 110 | 110 |
|  | Irradiation dose [kGy] | 50 | 50 | 50 | 50 | 30 | 80 |
| Heating Step | Oxygen concentration [ppm] | 1 or less | 200 | 300 | $2.1 \times 10^5$ | 1 or less | 1 or less |
|  | Heating temperature [° C.] | 120 | 120 | 120 | 120 | 120 | 120 |
|  | Heating time [hour] | 1 | 1 | 1 | 1 | 1 | 1 |
| Evaluation | Amount of coating layer [parts by weight] | 24 | 24 | 24 | 24 | 24 | 24 |
|  | Maximum thermal shrinkage rate [%] | 13 | 12 | 12 | 11 | 30 | 11 |
|  | Piercing strength [N] | 0.6 | 0.6 | 0.6 | 0.4 | 0.8 | 0.5 |
|  | Rate of retention of piercing strength [%] | 92 | 90 | 88 | 75 | 93 | 90 |
|  | Air permeability [sec/100 mL] | 102 | 98 | 101 | 100 | 92 | 103 |
|  | Surface porosity [%] | 28 | 27 | 28 | 26 | 28 | 29 |
|  | Radical quantity [$\times 10^{14}$ spins/100 mg] | 163 | 122 | 105 | 76 | 166 | 158 |

CROSS REFERENCE TO RELATED APPLICATION

This application claims the benefit of Japanese Patent Application No. 2014-225066, filed on Nov. 5, 2014, the disclosure of which is hereby incorporated in its entirety by reference.

INDUSTRIAL APPLICABILITY

The heat-resistant synthetic resin microporous film of the present invention has both good heat resistance and good mechanical strength and exhibits a suppressed decrease in mechanical strength over time. Therefore, this heat-resistant synthetic resin microporous film is suitably used as a nonaqueous electrolyte solution secondary battery separator.

The invention claimed is:

1. A heat-resistant synthetic resin microporous film comprising:
   a synthetic resin microporous film; and
   a coating layer formed on at least part of a surface of the synthetic resin microporous film and containing a polymer of a polymerizable compound having two or more radically polymerizable functional groups per molecule,
   the heat-resistant synthetic resin microporous film having a maximum thermal shrinkage rate of 15% or less when heated from 25° C. to 180° C. at a temperature rising rate of 5° C./min, a piercing strength of 0.6 N or more and a rate of retention of the piercing strength of 85% or more after heating at 70° C. for 168 hours.

2. The heat-resistant synthetic resin microporous film according to claim 1, wherein the heat-resistant synthetic resin microporous film has an air permeability of 50 to 600 sec/100 mL.

3. The heat-resistant synthetic resin microporous film according to claim 1, wherein the heat-resistant synthetic resin microporous film has a surface porosity of 25 to 55%.

4. The heat-resistant synthetic resin microporous film according to claim 1, wherein a radical quantity determined by an electron spin resonance method is $2.0 \times 10^{16}$ spins/100 mg or less.

5. The heat-resistant synthetic resin microporous film according to claim 1, wherein the coating layer contains the polymer obtained by polymerizing the polymerizable compound with irradiation of active energy rays.

6. The heat-resistant synthetic resin microporous film according to claim 2, wherein the heat-resistant synthetic resin microporous film has a surface porosity of 25 to 55%.

7. The heat-resistant synthetic resin microporous film according to claim 2, wherein a radical quantity determined by an electron spin resonance method is $2.0 \times 10^{16}$ spins/100 mg or less.

8. The heat-resistant synthetic resin microporous film according to claim 3, wherein a radical quantity determined by an electron spin resonance method is $2.0 \times 10^{16}$ spins/100 mg or less.

9. The heat-resistant synthetic resin microporous film according to claim 6, wherein a radical quantity determined by an electron spin resonance method is $2.0 \times 10^{16}$ spins/100 mg or less.

10. The heat-resistant synthetic resin microporous film according to claim 2, wherein the coating layer contains the polymer obtained by polymerizing the polymerizable compound with irradiation of active energy rays.

11. The heat-resistant synthetic resin microporous film according to claim 3, wherein the coating layer contains the polymer obtained by polymerizing the polymerizable compound with irradiation of active energy rays.

12. The heat-resistant synthetic resin microporous film according to claim 6, wherein the coating layer contains the polymer obtained by polymerizing the polymerizable compound with irradiation of active energy rays.

13. The heat-resistant synthetic resin microporous film according to claim 4, wherein the coating layer contains the polymer obtained by polymerizing the polymerizable compound with irradiation of active energy rays.

14. The heat-resistant synthetic resin microporous film according to claim 7, wherein the coating layer contains the polymer obtained by polymerizing the polymerizable compound with irradiation of active energy rays.

15. The heat-resistant synthetic resin microporous film according to claim 8, wherein the coating layer contains the polymer obtained by polymerizing the polymerizable compound with irradiation of active energy rays.

16. The heat-resistant synthetic resin microporous film according to claim 9, wherein the coating layer contains the polymer obtained by polymerizing the polymerizable compound with irradiation of active energy rays.

17. A method for producing a heat-resistant synthetic resin microporous film comprising:
   an applying step of applying a polymerizable compound having two or more radically polymerizable functional groups per molecule to at least part of a surface of a synthetic resin microporous film;
   an irradiating step of irradiating, with active energy rays at an irradiation dose of 40 to 70 kGy, the synthetic resin microporous film to which the polymerizable compound has been applied; and
   a heating step of heating, in an atmosphere having an oxygen concentration of 300 ppm or less, the synthetic resin microporous film irradiated with the active energy rays.

18. The method for producing a heat-resistant synthetic resin microporous film according to claim 17, wherein, in the irradiating step, the synthetic resin microporous film to which the polymerizable compound has been applied is irradiated with the active energy rays in an atmosphere having an oxygen concentration of 300 ppm or less.

* * * * *